United States Patent
Noderer et al.

(10) Patent No.: US 10,263,552 B2
(45) Date of Patent: Apr. 16, 2019

(54) ANTICIPATORY CONTROL USING OUTPUT SHAFT SPEED

(71) Applicant: Rolls-Royce North American Technologies Inc., Indianapolis, IN (US)

(72) Inventors: Keith D. Noderer, Carmel, IN (US); Russell E. White, Indianapolis, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 0 days.

(21) Appl. No.: 15/672,016

(22) Filed: Aug. 8, 2017

(65) Prior Publication Data
US 2019/0052207 A1 Feb. 14, 2019

(51) Int. Cl.
*H02P 9/04* (2006.01)

(52) U.S. Cl.
CPC ................................ *H02P 9/04* (2013.01)

(58) Field of Classification Search
USPC ................................ 290/40 B; 219/133, 134
See application file for complete search history.

(56) References Cited

U.S. PATENT DOCUMENTS

| | | | |
|---|---|---|---|
| 3,110,817 A | 11/1963 | Frederick | |
| 5,301,499 A | 4/1994 | Kure-Jensen et al. | |
| 8,115,328 B2 * | 2/2012 | Fosbinder | B23K 9/1006 290/1 A |
| 8,125,094 B2 * | 2/2012 | Radtke | B23K 9/10 290/40 B |
| 8,172,006 B2 * | 5/2012 | Moeny | E21B 7/15 175/16 |
| 8,186,454 B2 * | 5/2012 | Moeny | E21B 7/15 175/16 |
| 8,338,971 B2 * | 12/2012 | Radtke | B23K 9/10 290/1 A |
| 8,362,884 B2 * | 1/2013 | Duge | F41H 13/00 250/492.1 |
| 8,567,522 B2 * | 10/2013 | Moeny | E21B 7/15 175/16 |
| 8,616,302 B2 * | 12/2013 | Moeny | E21B 7/15 175/1 |
| 8,694,172 B2 * | 4/2014 | Kumula | H02J 3/01 700/287 |

(Continued)

OTHER PUBLICATIONS

Anonymous, "LSM200 Series Load Sharing Module," Oct. 1999, pp. 1-11, Governors America Corp., Agawam, MA.

(Continued)

*Primary Examiner* — Pedro J Cuevas
(74) *Attorney, Agent, or Firm* — Brinks Gilson & Lione (57) ABSTRACT

Methods and systems are provided to control engine speed droop. One such system may include an electric generator; an engine configured to power the electric generator via an output shaft; a control circuit configured to cause a speed of the output shaft to match a speed setpoint based on a feedback loop; and a processor configured to anticipate a change in a mechanical load on the engine and cause the speed setpoint of the output shaft to increase or decrease from a first value to a second value in response to anticipation of the change in the mechanical load on the engine.

20 Claims, 3 Drawing Sheets

(56) References Cited

U.S. PATENT DOCUMENTS

| | | | |
|---|---|---|---|
| 8,946,915 B2* | 2/2015 | Yu | B60L 15/2045 |
| | | | 290/40 B |
| 9,016,359 B2* | 4/2015 | Moeny | E21B 7/15 |
| | | | 166/65.1 |
| 9,145,213 B2* | 9/2015 | Myer | F02C 9/00 |
| 9,186,743 B2* | 11/2015 | Radtke | B23K 9/1006 |
| 9,222,409 B2* | 12/2015 | Kupratis | F02C 3/04 |
| 9,698,625 B2* | 7/2017 | Raats | H02J 9/06 |
| 9,796,037 B2* | 10/2017 | Beeson | B23K 9/1056 |
| 10,053,222 B2* | 8/2018 | Snyder | B64D 13/06 |
| 10,065,627 B2* | 9/2018 | Oldridge | B60L 15/2045 |
| 10,122,308 B2* | 11/2018 | Turpin | H02P 9/04 |
| 2006/0157459 A1* | 7/2006 | Fosbinder | B23K 9/1006 |
| | | | 219/130.21 |
| 2007/0051233 A1* | 3/2007 | Duge | F41H 13/00 |
| | | | 89/1.13 |
| 2008/0308541 A1* | 12/2008 | Hiroi | B23K 9/1043 |
| | | | 219/134 |
| 2009/0050371 A1* | 2/2009 | Moeny | E21B 10/00 |
| | | | 175/57 |
| 2010/0000790 A1* | 1/2010 | Moeny | E21B 7/15 |
| | | | 175/16 |
| 2010/0193489 A1* | 8/2010 | Beeson | B23K 9/1056 |
| | | | 219/133 |
| 2010/0194118 A1* | 8/2010 | Radtke | B23K 9/10 |
| | | | 290/40 B |
| 2010/0194356 A1* | 8/2010 | Fosbinder | B23K 9/1006 |
| | | | 322/25 |
| 2011/0236486 A1* | 9/2011 | Giammona | B23K 9/10 |
| | | | 424/488 |
| 2011/0316678 A1* | 12/2011 | Duge | F41H 13/00 |
| | | | 340/407.1 |
| 2012/0138582 A1* | 6/2012 | Radtke | B23K 9/10 |
| | | | 219/121.27 |
| 2012/0138587 A1* | 6/2012 | Fosbinder | B23K 9/1006 |
| | | | 219/133 |
| 2012/0168177 A1* | 7/2012 | Moeny | E21B 7/15 |
| | | | 166/380 |
| 2012/0217064 A1* | 8/2012 | Moeny | E21B 10/00 |
| | | | 175/16 |
| 2013/0015663 A1* | 1/2013 | Kumula | H02J 3/01 |
| | | | 290/52 |
| 2013/0140086 A1* | 6/2013 | Moeny | E21B 7/15 |
| | | | 175/16 |
| 2013/0239576 A1* | 9/2013 | Kupratis | F02C 3/04 |
| | | | 60/772 |
| 2014/0015257 A1* | 1/2014 | Dobbs | F02B 63/042 |
| | | | 290/40 B |
| 2014/0210256 A1* | 7/2014 | Raats | H02J 9/00 |
| | | | 307/9.1 |
| 2014/0265353 A1* | 9/2014 | Yu | B60L 15/2045 |
| | | | 290/40 B |
| 2015/0203209 A1* | 7/2015 | Myer | F02C 9/00 |
| | | | 701/3 |
| 2015/0308235 A1* | 10/2015 | Moeny | E21B 7/15 |
| | | | 166/244.1 |
| 2017/0036289 A1* | 2/2017 | Enyedy | B23K 9/1006 |
| 2017/0036290 A1* | 2/2017 | Enyedy | B23K 9/1006 |
| 2017/0036291 A1* | 2/2017 | Enyedy | B23K 9/1075 |
| 2018/0036823 A1* | 2/2018 | Meckler | B23K 9/1062 |
| 2018/0041151 A1* | 2/2018 | Turpin | H02P 9/04 |
| 2018/0104760 A1* | 4/2018 | Beeson | B23K 9/1056 |
| 2018/0161910 A1* | 6/2018 | Enyedy | B23K 9/1043 |
| 2018/0231340 A1* | 8/2018 | Ranjan | F41A 13/10 |
| 2018/0252115 A1* | 9/2018 | Himmelmann | F02C 3/20 |
| 2018/0252161 A1* | 9/2018 | Munevar | F02C 6/14 |
| 2018/0316295 A1* | 11/2018 | Eaknnan | H02P 9/14 |
| 2018/0327103 A1* | 11/2018 | Snyder | B64D 13/06 |

OTHER PUBLICATIONS

Javier Lopez et al., "Cyber Vulnerability in Power Systems Operation and Control," Critical Infrastructure Protection, Mar. 15, 2012, p. 205, vol. 7130 of Lecture Notes in Computer Science Security and Cryptology, Springer, Germany.

* cited by examiner

FIG. 3

ANTICIPATORY CONTROL USING OUTPUT SHAFT SPEED

TECHNICAL FIELD

This disclosure relates to power systems and, in particular, to power generation.

BACKGROUND

Integrated power and thermal management systems (IP-TMS) may use an engine, such as a gas turbine engine, as a prime mover for an electric generator. In pulsed-power applications of such systems, rapid application of mechanical load on the engine's output shaft can cause the speed of the output shaft to droop (or drop) to undesirable levels before an engine fuel controller may respond and restore the speed of the engine's output shaft. Typical fuel controllers for such engines are designed to monitor the output shaft speed and adjust fuel flow to the generator in order to try to maintain the output shaft speed at a constant speed. Such fuel controllers react to the reduction in output shaft speed by increasing fuel flow to the engine. If the prime mover is a multi-shaft gas turbine engine, the increased fuel, which is burnt in the combustor to increase the energy of the fluid stream, first acts on the inner shaft(s) to increase the speed of the inner shaft(s) and, correspondingly, on the energy of an output flow of the gas turbine engine. This increased energy is seen eventually by the output shaft of the engine, which causes an increase in the output power and thus restores the output shaft speed to the constant speed. There is naturally a lag, not only in the time that it takes the fuel controllers to detect the decrease in output shaft speed and respond by increasing the fuel flow, but also in the time between increasing the fuel flow and having the increase in useful energy arrive at the output shaft.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a system to control engine droop may include an electric generator, an engine configured to power the electric generator via an output shaft, a control circuit configured to cause a speed of the output shaft to match a speed setpoint based on a feedback loop, and a processor. The processor may be configured to anticipate a change in a mechanical load on the engine and cause the speed setpoint of the output shaft to increase or decrease from a first value to a second value in response to anticipation of the change in the mechanical load on the engine.

Anticipation of the change in mechanical load may be used, for example, to increase the speed of the output shaft of the engine prior to applying an increased load on the engine. Some systems are designed to operate the output shaft of the engine within a relatively small band around a design speed setpoint so that excursions in the speed of the output shaft—either higher or lower—are undesirable. Alternatively, if a system is designed such that the outputs shaft may operate over a wider range of output shaft speeds, then the output shaft speed may be increased, for example, prior to the increased load, thereby storing energy in a rotational mass of a drivetrain of the engine. The stored energy in the rotational mass may prevent the speed of the output shaft from drooping to levels that may cause issues with electrical system power regulation. In some examples, the elevated speed may be held for an extended duration regardless of when the increase in load is actually applied. The system may consider the allowed input speeds for devices loading the engine (such as the generator) in determining a new speed setpoint for the output shaft of the engine. Alternatively or in addition, the system may consider the allowed speeds of the engine itself to guard against operating the engine at higher speeds that may cause overspeed issues.

Figure 1:
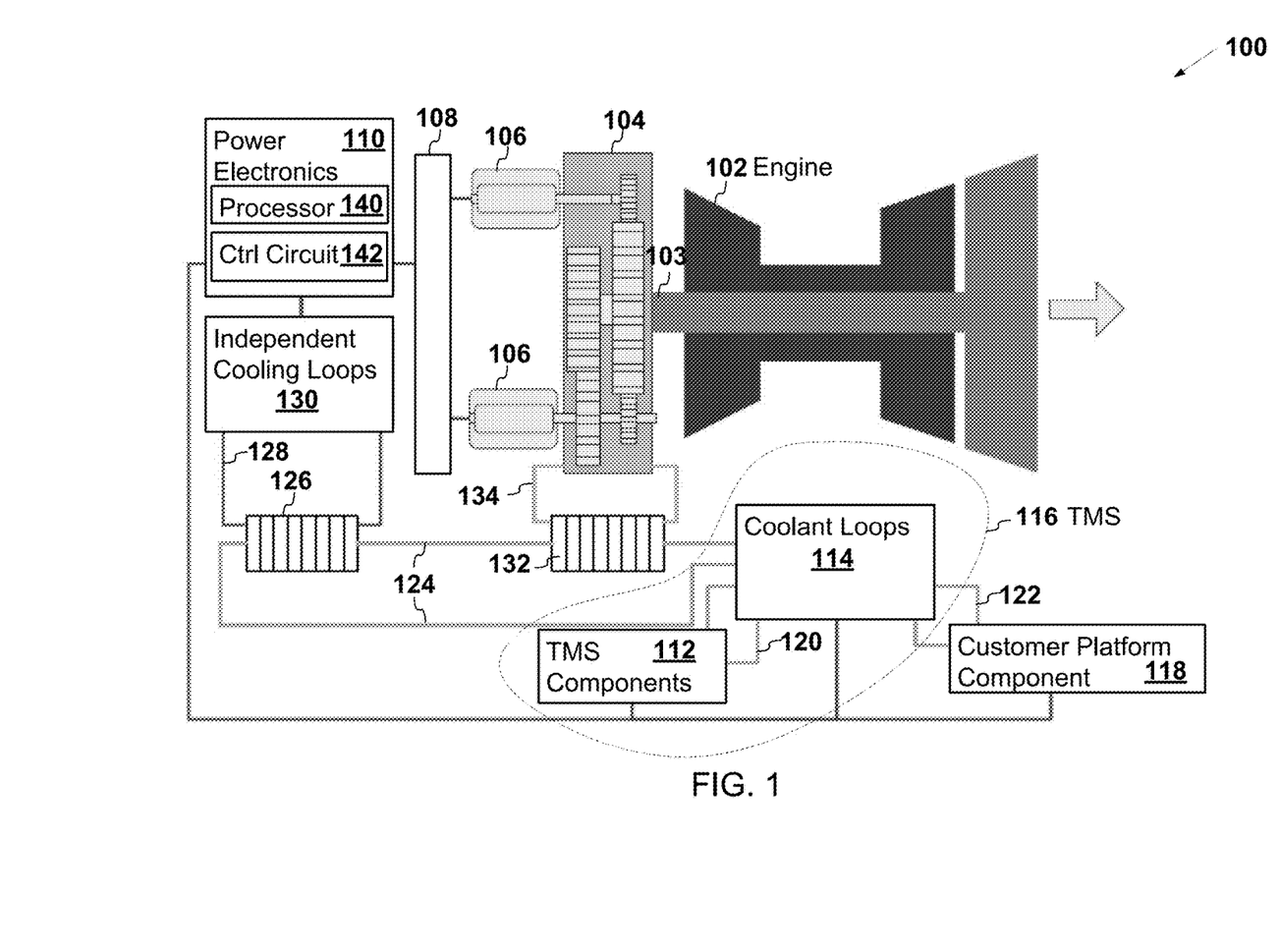
FIG. 1 illustrates a schematic of an example of a system to control engine speed droop.

FIG. 1 illustrates a schematic of an example of a system 100 to control engine speed droop. The system 100 may include an engine 102, an output shaft 103 of the engine 102, a gearbox 104, a generator 106 (two generators are shown in FIG. 1), an electrical bus 108 for the generator 106, power electronics 110, thermal management system components 112, and thermal management coolant loops 114.

The engine 102 may include any source of mechanical power that can drive the generator 106. Examples of the engine 102 may include a gas turbine engine, an internal combustion engine, a gas engine, a reciprocating engine, a diesel engine, a turbo fan, any other type of engine, propeller(s) of a wind turbine, and any other source of mechanical power. The engine 102 in the example shown in FIG. 1 is a gas turbine engine.

The gearbox 104 may include any device that performs speed and/or torque conversions from a rotating power source to another device. Examples of the gearbox 104 may include gears, a gear train, a transmission, or any other type of device that performs rotational speed and/or torque conversions.

The generator 106 may include any type of electrical generator. Examples of the generator 106 may include a synchronous generator, an induction generator, an asynchronous generator, a permanent magnet synchronous generator, an AC (Alternating Current) generator, a DC (Direct Current) generator, a synchronous generator with stator coils, or any other device that converts mechanical power to electric power.

The electrical bus 108 may include any connector or connectors that conduct electricity. Examples of the electrical bus 108 may include a busbar, a busway, a bus duct, a solid tube, a hollow tube, a wire, an electrical cable, or any other electrical conductor.

The power electronics 110 may include any device or combination of devices that control and/or convert electric power. Examples of the power electronics 110 may include a power converter, a rectifier, an AC to DC converter, a DC to DC converter, a switching device, a diode, a thyristor, an inverter, a transistor, and a capacitor. The power electronics 110 may include semiconductor and/or solid state devices.

The example of the power electronics 110 shown in FIG. 1 includes a processor 140 and a control circuit 142. The processor 140 may be configured to control electric power output. The processor 140 may be any device that performs logic operations. The processor 140 may be in communication with memory (not shown) and the control circuit 142. The processor 140 may also be in communication with additional components, such as a display (not shown). The processor 140 may include a general processor, a central processing unit, a computing device, an application specific integrated circuit (ASIC), a digital signal processor, a field programmable gate array (FPGA), a digital circuit, an analog circuit, a microcontroller, any other type of processor, or any combination thereof. The processor 140 may include one or more elements operable to execute computer executable instructions or computer code embodied in the memory to control electric power output of the generator.

The control circuit 142 may include any feedback circuit configured to cause (in other words, attempt to cause) a speed of the output shaft 103 to match a speed setpoint based on a feedback loop. The control circuit 142 may include circuitry that samples an output signal and then feeds the sampled output signal back to an input in order to form an error signal. For example, the control circuit 142 may include a component that samples an output signal of a speed sensor (not shown) to determine the speed of the output shaft 103, and a component to subtract the sampled speed of the output shaft 103 from the speed setpoint to arrive at the error signal. The speed setpoint represents the input. The error signal represents how different the speed of the output shaft 103 currently is from the speed setpoint. The control circuit 142 may cause an adjustment in fuel flow to the engine 102, for example, in an attempt to limit the magnitude of the error indicated by the error signal. The control circuit 142 may include a general processor, a central processing unit, a computing device, an application specific integrated circuit (ASIC), a digital signal processor, a field programmable gate array (FPGA), a digital circuit, an analog circuit, a microcontroller, any other type of processor, or any combination thereof.

The output shaft 103 of the engine 102 is shown in FIG. 1 as a shaft extending directly from the engine 102. More generally, the output shaft 103 of the engine 102 may be any shaft of a drive train powered by the engine 102. The drive train may include, for example, the gearbox 104, a transmission, a clutch, or the shaft extending directly from the engine 102. Accordingly, for example, the output shaft 103 may be a shaft included in the gearbox 104. Similarly, the control circuit 142 may be configured to adjust the speed of such a shaft based on the speed setpoint for that shaft.

The thermal management system components 112 may include any component of a thermal management system. Examples of the thermal management system components 112 may include a thermal energy storage, a vapor cycle system (VCS), an air cycle system (ACS), a compressor, a valve, a gas cooler, a heat exchanger, a recuperator, an evaporator, a condenser, a battery, a coolant pump, a controller, and any other component of any type of cooling system. The thermal management system components 112 together and/or separately may have a capability to provide cooling and/or heating.

As described in more detail below, the cooling and/or heating provided by the thermal management system components 112 may be distributed by a coolant, such as ethylene glycol and water (EGW) or propylene glycol and water (PGW), through the thermal management coolant loops 114. In more general terms, the combination of the thermal management system components 112 and the thermal management coolant loops 114 form a thermal management system 116. The thermal management system 116 may provide cooling and/or heating to one or more target devices or target components.

During operation of the system 100, the system 100 may provide electrical power to a customer platform component 118. Alternatively or in addition, the system 100 may cool and/or heat the customer platform component 118. The electrical power may by generated by the generator 106 of the system 100 and the cooling and/or the heating may be provided by the thermal management system 116 of the system 100.

The customer platform component 118 includes any device or combination of devices that consumes electricity. In some examples, the customer platform component 118 may be any apparatus or system that includes electronics and that may benefit from cooling and/or heating. Examples of the customer platform component 118 may include solid state electronics, a light-emitting diode (LED), an analog circuit, a digital circuit, a computer, a server, a server farm, a data center, a hoteling circuit such as vehicle electronics, a vehicle, an aircraft, a directed-energy weapon, a laser, a plasma weapon, a railgun, a microwave generator, a pulsed-powered device, a satellite uplink, a radar system, an electrically-driven machine, an electric motor, or any other electronic device.

In the example illustrated in FIG. 1, the system 100 is an integrated power and thermal management system. The integrated power and thermal management system may be considered "integrated" because electrical power generated by the system 100 may power a device within the system 100, such as components of the thermal management system 116. Alternatively or in addition, integrated power and thermal management system may be considered "integrated" because the thermal management system 116 may cool and/or heat components of the system 100, such as the power electronics 110, the gearbox 104, or any component of the engine 102.

As mentioned above, the cooling and/or the heating provided by the thermal management system components 112 may be distributed by a coolant via the thermal management coolant loops 114. The thermal management coolant loops 114 may include independent loops in which coolant is circulated using, for example, pumps. Heat may be exchanged between two independent loops using a heat exchanger, such as a recuperator, an evaporator, or a condenser.

For example, a first loop 120 may be cooled by the thermal management system components 112. The cooled coolant in the first loop 120 may cool a coolant in a second loop 122 via a heat exchanger (not shown). In cooling the coolant in the second loop 122, the coolant in the first loop 120 may become warmer. The warmed coolant in the first loop 120 may be pumped back to the thermal management system components 112 where the coolant is again cooled. Meanwhile, the cooled coolant in the second loop 122 may be pumped to the customer platform component 118 where the coolant cools the customer platform component 118. When cooling the customer platform component 118, the coolant in the second loop 122 may become warmer. The warmed coolant in the second loop 122 may be pumped back to the heat exchanger where the coolant is again cooled by the first loop 120 via the heat exchanger.

In another example, the cooled coolant in the first loop 120 may cool a coolant in a third loop 124 via a heat exchanger (not shown) in a similar manner. The cooled coolant in the third loop 124 may cool the power electronics 110 by passing through a power electronics heat exchanger 126 that cools a coolant in a fourth loop 128. The cooled coolant in the fourth loop 128 may cool the power electronics 110 and/or cool one or more additional independent cooling loops 130 that in turn cool the power electronics 110.

Alternatively or in addition, the cooled coolant in the third loop 124 (or the warmed coolant in the third loop 124 that exits the power electronics heat exchanger 126) may pass through a gear box heat exchanger 132. The coolant in the third loop 124 that passes through the gear box heat exchanger 132 may cool oil in an oil loop 134 that flows through the gearbox 104. In such a configuration, the thermal management system 116 may cool the oil in the gearbox 104.

The thermal management coolant loops 114, such as the first loop 120, the second loop 122, the third loop, 124, and the fourth loop 128, that are illustrated in FIG. 1 are simply examples of the thermal management coolant loops 114. In other examples, the thermal management coolant loops 114 may include additional, fewer, or different coolant loops than shown in FIG. 1. Alternatively or in addition, the thermal management system 116 may cool additional, fewer, or different components of the system 100 than shown in FIG. 1.

With respect to generating electrical power, the engine 102 may cause the output shaft 103 of the engine to rotate, which then causes an input shaft (not shown) of the generator 106 to rotate via the gearbox 104 during operation of the system 100. As the input shaft of the generator 106 rotates, the generator 106 may generate electricity. The electrical bus 108 may transmit the generated electricity to the power electronics 110. The power electronics 110 may transform, control, and/or store the generated electricity. For example, the power electronics 110 may convert AC current generated by the generator 106 into DC current for delivery to the customer platform component 118. In some examples, the power electronics 110 may deliver electricity to one or more components of the thermal management system 116 and/or to any other component of the system 100.

With respect to controlling engine speed droop, the processor 140 may anticipate a change in mechanical load on the engine 102. In response to the anticipation of the change in the mechanical load on the engine 102, the processor 140 may cause the speed setpoint of the output shaft 103 to increase or decrease. For example, the processor 140 may cause the speed setpoint to increase or decrease by instructing the control circuit 142 to set the speed setpoint to a target value.

Figure 2:
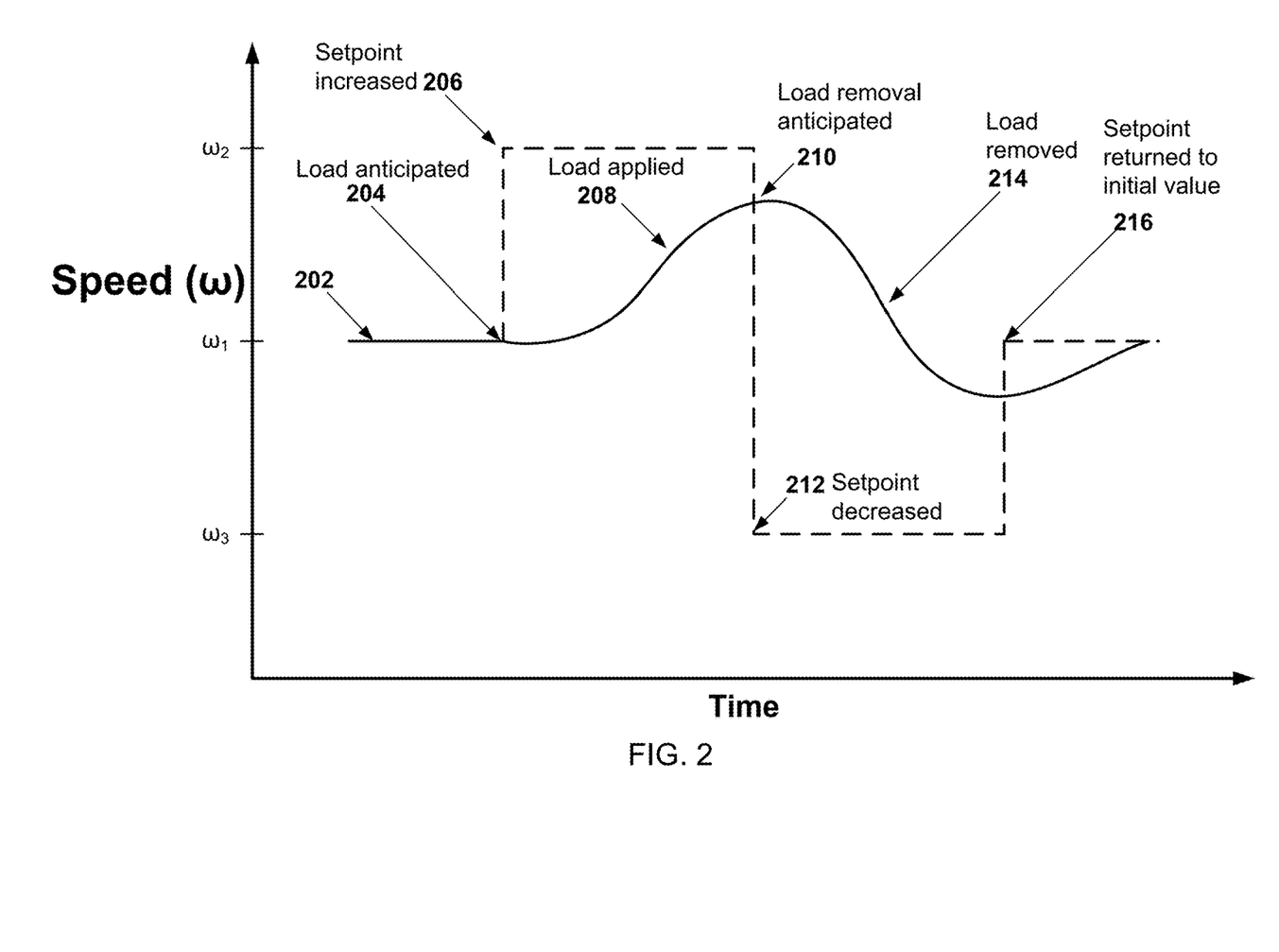
FIG. 2 illustrates the speed of an output shaft of an engine over time in an example of controlling engine speed droop.

FIG. 2 illustrates the speed of the output shaft 103 of the engine 102 over time in an example of the processor 140 controlling engine speed droop. Initially (202), the speed setpoint and the speed of the output shaft 103 are at a first value, $\omega_1$. The processor 140 then anticipates (204) an increase in mechanical load on the engine 102. In response, the processor 140 causes (206) the speed setpoint to increase to a second value, $\omega_2$. Because of the increased speed setpoint, the control circuit 142 forces the speed of the output shaft 103 to increase toward the increased setpoint value, $\omega_2$. Eventually, the engine 102 experiences (208) the increase in mechanical load. In response, the speed of the output shaft 103 begins to decrease or, as shown in FIG. 2, the rate of acceleration of the output shaft 103 begins to decrease. Next, the processor 140 anticipates (210) that the increased mechanical load on the engine 102 is going to be removed or the mechanical load on the engine is going to be otherwise decreased. In response, the processor 140 causes (212) the speed setpoint to decrease to a third value, $\omega_3$. Because of the decreased speed setpoint, the control circuit 142 forces the speed of the output shaft 103 to decrease toward the decreased speed setpoint, $\omega_3$. Eventually, the mechanical load on the engine 102 is removed or decreased (214). In response to the removal or decrease (214) in mechanical load, the speed of the output shaft 103 of the engine 102 begins to increase, or as shown in FIG. 2, the rate of deceleration of the output shaft 103 begins to decrease. If droop is desired, then the processor 140 may return the speed setpoint to first value, $\omega_1$ after the speed of the output shaft 103 drops below the first value. Alternatively, if no droop is desired, then the processor 140 may return the speed setpoint to the first value before the speed of the output shaft 103 drops below the first value.

In some examples, such as the one in FIG. 2, the processor 140 may decrease the speed setpoint from the second value, $\omega_2$, before the speed of the output shaft 103 reaches a speed equal to the second value. Alternatively or in addition, the processor 140 may maintain the speed setpoint at the second value, $\omega_2$, until after the increase in mechanical load is removed from the engine 102. More generally, the processor 140 may maintain the speed setpoint above the first value, $\omega_1$—but in some examples lower than the second value, $\omega_2$—until after the increase in mechanical load is removed from the generator.

The processor 140 may anticipate the change (increase or decrease) in the mechanical load on the engine 102 based on detection of a change in an electrical load on the generator 106. For example, referring back to FIG. 1, the processor 140, though a sensor (not shown), may detect a change in voltage or current at an output of the generator 106. The change in voltage or current at an output of the generator 106 may indicate a change in the electrical load on the generator 106. The change at the output of the generator 106 may occur before the engine 102 experiences a corresponding change in mechanical load. Accordingly, detecting the change in the electrical load on the generator 106 enables anticipation of the change in mechanical load on the engine 102.

Alternatively or in addition, the processor 140 may anticipate the change (increase or decrease) in the mechanical load on the engine 102 based on detection of a change in mechanical load on the drive train. Any variable load mechanically attached to the output shaft 103 of the engine 102, either through the gearbox 104 or any other portion of the drive chain, may indicate anticipation of a load change to the engine 102 and thus serve as an anticipatory signal of an upcoming change in the mechanical load on the engine 102.

Alternatively or in addition, the processor 140 may anticipate the change (increase or decrease) in the mechanical load on the engine 102 based on an anticipation of a change in electrical load on the generator 106 to be caused by a component powered by the generator 106. Anticipation of the change in electrical load on the generator 106 may be considered an anticipation of a change in the mechanical load on the engine 102.

As indicated above, the customer platform component 118 is powered by the generator 106. The customer platform component 118 may provide information and/or a signal that indicates an upcoming change in electrical load imposed on the generator 106 by the customer platform component 118. Alternatively or in addition, the processor 140 may use heuristics and/or artificial intelligence to predict a change in electrical load that will likely be subsequently imposed by the customer platform component 118.

As indicated above, components of the thermal management system 116 may be powered by the generator 106.

Accordingly, in some examples, the thermal management system 116 may provide information and/or a signal that indicates an upcoming change in electrical load imposed on the generator 106 by the thermal management system (TMS) 116. For example, before the TMS 116 turns on a compressor or other device included in the thermal management system components 112, the TMS 116 may provide the processor 140 with an indication that the device will be turned on.

The system 100 may include additional, fewer, or different components than shown in FIG. 1. For example, the system 100 may include additional or fewer heat exchangers than shown in FIG. 1. As another example, the system 100 may not include the additional independent cooling loops 130 that cool the power electronics 110. In still another example, the power electronics 110 may be integrated with the generator 106 so as to eliminate the discrete electrical bus 108 shown in FIG. 1. In yet another example, the system 100 may include only one generator. In some examples, the system 100 may not include the gearbox 104. Instead, the generator 106 may be directly coupled to a mechanical output, such as a shaft, of the engine 102.

In the example shown in FIG. 1, the processor 140 and the control circuit 142 are included in the power electronics. However, the processor 140 and/or the control circuit 142 may be included in any other component of the system 100. For example, the system 100 may include a system controller (not shown) that controls and coordinates operation of components of the integrated power and thermal management system. The processor 140 and/or the control circuit 142 may be included in the system controller.

In some examples, the system controller may provide the processor 140 with information and/or a signal that indicates an upcoming change in electrical load imposed on the generator 106 by a component of the thermal management system (TMS) 116, the customer platform component 118, or other component. Alternatively or in addition, the processor 140 may be the system controller or be included therein.

In some examples, the system 100 to control engine speed droop may not be an integrated power and thermal management system. Alternatively or in addition, the system 100 may not include the thermal management system 116, the heat exchangers 126 and 132, and other components related to the thermal management system 116. For example, the system 100 may include the engine 102, the generator 106, the processor 140, and the control circuit 142.

Figure 3:
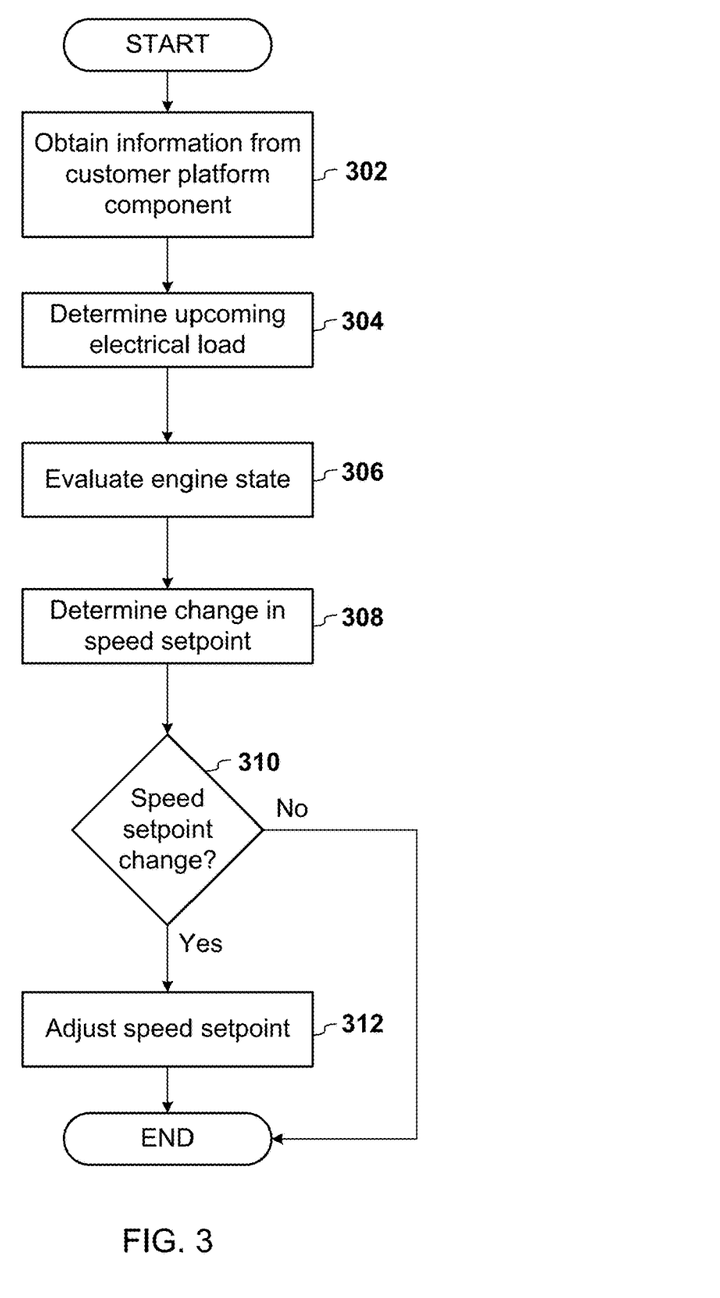
FIG. 3 illustrates a flow diagram of an example of logic to control engine speed droop.

FIG. 3 illustrates a flow diagram of an example of logic to control engine speed droop. The operations may include additional, different, or fewer operations than illustrated in FIG. 3. The steps may be executed in a different order than illustrated in FIG. 3.

Information may be obtained (302) from the customer platform component 118. For example, customer platform component 118 may have foreknowledge of electrical and/or thermal loads that are going to be applied to the system 100. In other words, the customer platform component 118 may have foreknowledge of future electrical and/or thermal demand(s) on the system 100. In one such example, the customer platform component 118 may have knowledge of a sequential list of tasks to be executed. For example, the tasks may identify a set of electric current pulses that the customer platform component 118 will attempt to draw from the system 100. The task list may identify, for example, when each pulse will occur, the duration of each pulse, and/or the magnitude of each pulse. The processor 140 may obtain and/or receive the task list or other information indicative of future electrical and/or thermal loads from the customer platform component 118.

Next, upcoming or future electrical load(s) may be determined (304) from the information received from the customer platform component 118. For example, the processor 140 may determine future electrical load(s) based on time to next pulse(s), duration of pulse(s), magnitude of pulse(s), any other aspect of the information received from the customer platform component 118, information related to loads on or from the thermal management system 116, and/or any other future electrical loads on the generator 106 that may be expected. The processor 140 may combine information about future electrical loads on the generator 106 in order to obtain aggregate future electrical load(s). Alternatively or in addition, the processor 140 may determine future electrical load(s) based on anticipated cooling and/or heating loads on the thermal management system 116. For example, the processor 140 may use an algorithm to convert anticipated thermal loads to anticipated electrical loads that the thermal management system 116 will exert on the generator 106 when subsequently experiencing the anticipated thermal loads. Alternatively or in addition, the thermal management system 116 may convert anticipated thermal loads to anticipated electrical loads and notify the processor 140 of the anticipated electrical loads.

The current engine state of the engine 102 may be evaluated (306). The current engine state may include, for example, the speed setpoint, the speed of the output shaft 103, and ambient conditions such as the temperature of the engine 102. The processor 140 may receive the engine state from a collection of sensors, the control circuit 142, and/or any other source(s).

Next, a change in the speed setpoint may be determined (308). The processor 140 may determine the change in the speed setpoint based on load level, time between load applications, engine state, and/or other system-level considerations in order to determine when and how much to change the speed setpoint for the output shaft 103 from its current value or initial value. For example, the change in speed may be the difference between a threshold value and the initial speed of the output shaft 103. The threshold value may be below a maximum design speed of the output shaft 103 of the engine 102. In some examples, the initial value may be a steady-state value that is applicable when the customer platform component 118 is not drawing any electricity. Alternatively or in addition, the initial value may merely be the current value of the speed setpoint when the information is obtained (302) from the customer platform component 118.

The change may include increasing the setpoint in anticipation of an upcoming load increase or decreasing the setpoint in anticipation of a load decrease. Alternatively, the change in the speed setpoint may be zero or another value that indicates the speed setpoint is not be changed.

For example, if a load increase or decrease is anticipated to be relatively small, in other words below a threshold value, then the change in the speed setpoint may be zero. Alternatively or in addition, if the anticipated load increase or decrease is going to slowly change, in other words, increase or decrease over at least a predetermined period of time or at a less than a threshold rate of change, then the change in the speed setpoint may be zero. Alternatively or in addition, if the anticipated change in load is expected to be a short duration, in other words less than a predetermined period of time, then the change in the speed setpoint may be zero. Changes in loads that last a relatively short time may not impact the speed of the output shaft 103 of the engine 102 very much because, at least in some examples, the inertia of the system 100 may tend to average and smooth the resulting mechanical load on the engine 102.

The engine state may affect the ability of the engine 102 to accelerate or decelerate the output shaft 103. Alternatively or in addition, the engine state may influence when the change in the speed setpoint is made and/or a magnitude of the change in the speed setpoint. Acceleration or deceleration of the output shaft 103 of the engine 102 may be affected by ambient conditions (such as temperature and/or pressure) and the "health" of the engine 102.

If the speed setpoint is to be changed (310), then the speed setpoint may be adjusted (312). For example, the processor 140 may direct the control circuit 142 to set the speed setpoint to a new value that reflects the change in the speed setpoint from the initial value. After changing the speed setpoint, operations may end. Alternatively, if the speed setpoint is not to be changed, then the operations may end without changing the speed setpoint.

Operations may end by, for example, returning to obtain (302) the information from the customer platform component 118. In another example, operations may end by not performing any more operations.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A method of controlling engine speed droop, the method comprising:
generating electricity from an electric generator powered by an output shaft of an engine;
anticipating, by a processor, an increase in a mechanical load on the engine; and
increasing a speed setpoint of the output shaft of the engine from a first value to a second value in response to anticipation of the increase in the mechanical load on the engine, wherein a control circuit attempts to cause a speed of the output shaft to match the speed setpoint based on a feedback loop.

2. The method of aspect 1 further comprising:
anticipating, by the processor, a removal of the increase in the mechanical load on the engine; and
decreasing the speed setpoint of the output shaft of the engine to a third value that is lower than the first value in response to anticipation of the removal of the increase in the mechanical load on the engine.

3. The method of any of aspects 1 to 2 further comprising:
anticipating, by the processor, a removal of the increase in the mechanical load on the engine; and
decreasing the speed setpoint of the output shaft of the engine to the first value in response to anticipation of the removal of the increase in the mechanical load on the engine.

4. The method of any of aspects 1 to 3 further comprising decreasing the speed setpoint from the second value before the speed of the output shaft reaches a speed equal to the second value.

5. The method of any of aspects 1 to 4 further comprising maintaining the speed setpoint above the first value until after the increase in mechanical load is removed from the engine.

6. The method of any of aspects 1 to 5 further comprising maintaining the speed setpoint at the second value until after the increase in mechanical load is removed from the engine.

7. The method of any of aspects 1 to 6, wherein the anticipating the increase in the mechanical load comprises anticipating an increase in an electrical load from a component of an integrated power and thermal management system (IPTMS) or from a system powered by the IPTMS, wherein the IPTMS includes the engine and the electric generator.

8. A system to control engine speed droop, the system comprising:
an electric generator;
an engine configured to power the electric generator via an output shaft;
a control circuit configured to cause a speed of the output shaft to match a speed setpoint based on a feedback loop; and
a processor configured to:
anticipate a change in a mechanical load on the engine; and
cause the speed setpoint of the output shaft to increase or decrease from a first value to a second value in response to anticipation of the change in the mechanical load on the engine.

9. The system of aspect 8, wherein the change that the processor is configured to anticipate includes a removal of a portion of the mechanical load on the engine, and the processor is configured to cause the speed setpoint to decrease in response to anticipation of the removal of the portion of the mechanical load.

10. The system of any of aspects 8 to 9, wherein the change that the processor is configured to anticipate includes an increase of the mechanical load on the engine, and the processor is configured to cause the speed setpoint to increase in response to anticipation of the increase of the mechanical load.

11. The system of any of aspects 8 to 10, wherein the processor is configured to anticipate the change in the mechanical load on the engine based on detection of a change in an electrical load on the electric generator.

12. The system of any of aspects 8 to 11 further comprising a drive train that includes the output shaft of the engine, wherein the processor is configured to anticipate the change in the mechanical load on the engine based on detection of a change in mechanical load on the drive train.

13. The system of any of aspects 8 to 12, wherein the processor is configured to anticipate the change in the mechanical load on the engine based on an anticipation of a change in electrical load on the electric generator to be caused by a component powered by the electric generator.

14. The system of any of aspects 8 to 13, wherein the second value of the speed setpoint is a threshold value that is below a maximum design speed of the output shaft.

15. A system to control engine speed droop, the system comprising:

an electric generator configured to generate electricity for a customer platform component;
an engine configured to power the electric generator via an output shaft;
a thermal management system configured to cool and/or heat the customer platform component;
a control circuit configured to cause a speed of the output shaft to match a speed setpoint based on a feedback loop; and
a processor configured to:
anticipate a change in electrical demand by the customer platform component; and
cause the speed setpoint of the output shaft of the engine to change from a first value to a second value in response to anticipation of the change in electrical demand by the customer platform component.

16. The system of aspect 15, wherein the system is an integrated power and thermal management system in which the electric generator is configured to power a component of the thermal management system.

17. The system of any of aspects 15 to 16, wherein the customer platform component includes a pulsed-powered device.

18. The system of any of aspects 15 to 17, wherein the customer platform component includes a directed-energy weapon.

19. The system of any of aspects 15 to 18, wherein the processor is configured to cause the speed setpoint of the output shaft to increase in response to the anticipated change in electrical demand being positive.

20. The system of any of aspects 15 to 19, wherein the processor is configured to cause the speed setpoint of the output shaft to decrease in response to the anticipated change in electrical demand being negative.

What is claimed is:

1. A method of controlling engine speed droop, the method comprising:
generating electricity from an electric generator powered by an output shaft of an engine;
anticipating, by a processor, an increase in a mechanical load on the engine; and
increasing a speed setpoint of the output shaft of the engine from a first value to a second value in response to anticipation of the increase in the mechanical load on the engine, wherein a control circuit attempts to cause a speed of the output shaft to match the speed setpoint based on a feedback loop, and wherein the speed of the output shaft increases prior to the increase in the mechanical load due to the increase of the speed setpoint from the first value to the second value.

2. The method of claim 1 further comprising:
anticipating, by the processor, a removal of the increase in the mechanical load on the engine; and
decreasing the speed setpoint of the output shaft of the engine to a third value that is lower than the first value in response to anticipation of the removal of the increase in the mechanical load on the engine.

3. The method of claim 1 further comprising:
anticipating, by the processor, a removal of the increase in the mechanical load on the engine; and
decreasing the speed setpoint of the output shaft of the engine to the first value in response to anticipation of the removal of the increase in the mechanical load on the engine.

4. The method of claim 1 further comprising decreasing the speed setpoint from the second value before the speed of the output shaft reaches a speed equal to the second value.

5. The method of claim 1 further comprising maintaining the speed setpoint above the first value until after the increase in mechanical load is removed from the engine.

6. The method of claim 1 further comprising maintaining the speed setpoint at the second value until after the increase in mechanical load is removed from the engine.

7. The method of claim 1, wherein the anticipating the increase in the mechanical load comprises anticipating an increase in an electrical load from a component of an integrated power and thermal management system (IPTMS) or from a system powered by the IPTMS, wherein the IPTMS includes the engine and the electric generator.

8. A system to control engine speed droop, the system comprising:
an electric generator;
an engine configured to power the electric generator via an output shaft;
a control circuit configured to cause a speed of the output shaft to match a speed setpoint based on a feedback loop; and
a processor configured to:
anticipate a change in a mechanical load on the engine; and
cause the speed setpoint of the output shaft to increase or decrease from a first value to a second value in response to anticipation of the change in the mechanical load on the engine such that the speed of the output shaft increases if the anticipated change is positive, or decreases if the anticipated change is negative, prior to the change in the mechanical load.

9. The system of claim 8, wherein the change that the processor is configured to anticipate includes a removal of a portion of the mechanical load on the engine, and the processor is configured to cause the speed setpoint to decrease in response to anticipation of the removal of the portion of the mechanical load.

10. The system of claim 8, wherein the change that the processor is configured to anticipate includes an increase of the mechanical load on the engine, and the processor is configured to cause the speed setpoint to increase in response to anticipation of the increase of the mechanical load.

11. The system of claim 8, wherein the processor is configured to anticipate the change in the mechanical load on the engine based on detection of a change in an electrical load on the electric generator.

12. The system of claim 8 further comprising a drive train that includes the output shaft of the engine, wherein the processor is configured to anticipate the change in the mechanical load on the engine based on detection of a change in mechanical load on the drive train.

13. The system of claim 8, wherein the processor is configured to anticipate the change in the mechanical load on the engine based on an anticipation of a change in electrical load on the electric generator to be caused by a component powered by the electric generator.

14. The system of claim 8, wherein the second value of the speed setpoint is a threshold value that is below a maximum design speed of the output shaft.

15. A system to control engine speed droop, the system comprising:
an electric generator configured to generate electricity for a customer platform component;
an engine configured to power the electric generator via an output shaft;
a thermal management system configured to cool and/or heat the customer platform component;

a control circuit configured to cause a speed of the output shaft to match a speed setpoint based on a feedback loop; and a processor configured to:

anticipate a change in electrical demand by the customer platform component; and cause the speed setpoint of the output shaft of the engine to change from a first value to a second value in response to anticipation of the change in electrical demand by the customer platform component such that the speed of the output shaft increases if the anticipated change is positive, or decreases if the anticipated chance is negative, prior to the change in the electrical demand.

16. The system of claim 15, wherein the system is an integrated power and thermal management system in which the electric generator is configured to power a component of the thermal management system.

17. The system of claim 15, wherein the customer platform component includes a pulsed-powered device.

18. The system of claim 15, wherein the customer platform component includes a directed-energy weapon.

19. The system of claim 15, wherein the processor is configured to cause the speed setpoint of the output shaft to increase in response to the anticipated change in electrical demand being positive.

20. The system of claim 15, wherein the processor is configured to cause the speed setpoint of the output shaft to decrease in response to the anticipated change in electrical demand being negative.

* * * * *